April 15, 1952
G. T. HART
2,592,691
AVOIDING EFFECT OF MOISTURE DURING
HIGH-FREQUENCY DIELECTRIC HEATING
Filed Aug. 31, 1946
2 SHEETS—SHEET 1
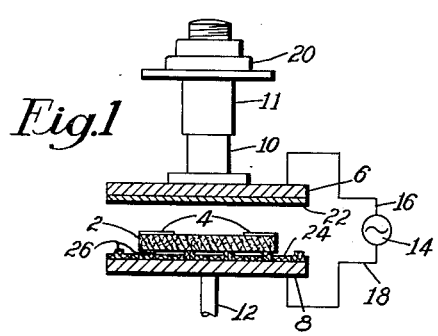
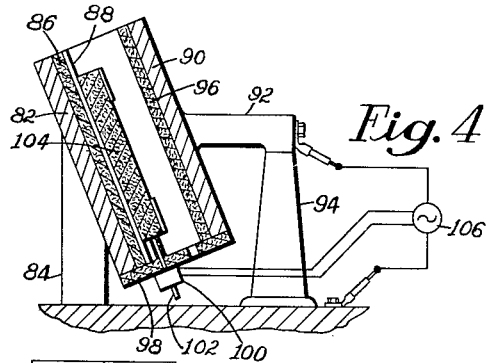
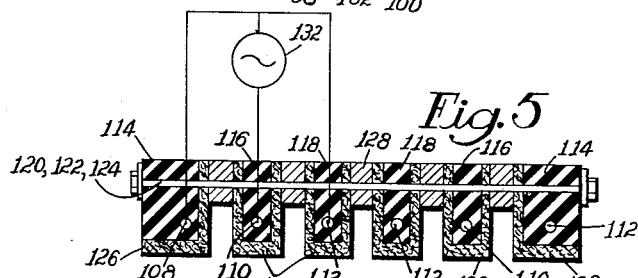
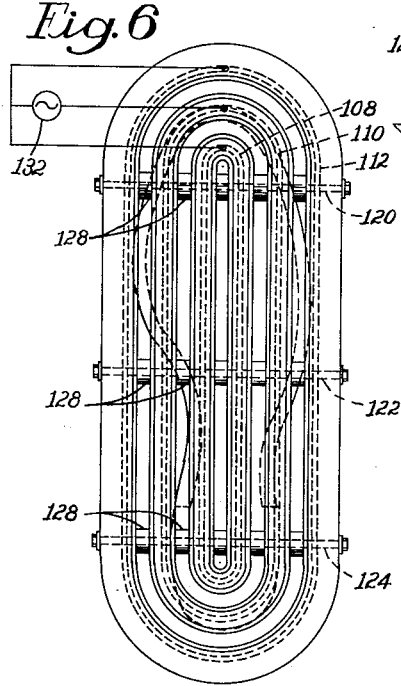
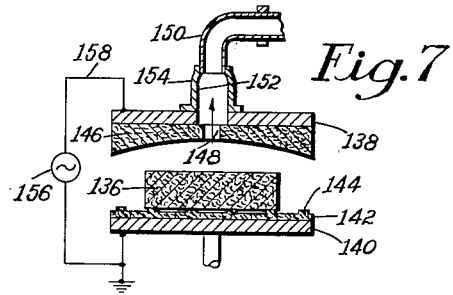
Inventor
George T. Hart
By His Attorney Inventor
George T. Hart
By His Attorney Patented Apr. 15, 1952

2,592,691

UNITED STATES PATENT OFFICE 2,592,691

AVOIDING EFFECT OF MOISTURE DURING HIGH-FREQUENCY DIELECTRIC HEATING

George T. Hart, Lynn, Mass., assignor to United Shoe Machinery Corporation, Flemington, N. J., a corporation of New Jersey Application August 31, 1946, Serial No. 694,305

13 Claims. (Cl. 34—1)

This invention relates to the treatment of materials with a high frequency electrical field and to the disposal of vapors driven from the materials or from other objects in the field during such treatment.

In heating or otherwise treating dielectric objects by subjecting them to a high frequency field, the problem often presents itself of preventing the condensation of evaporated moisture in droplets on electrode parts of the apparatus. Such an accumulation of moisture is highly disadvantageous since it causes voltage breakdown with resultant arcing and lowers the system efficiency due to the electrically dissipative nature of condensed moisture. Sometimes the primary purpose of the treatment is to drive off the moisture from the object; other times the evaporation of moisture may be a wholly unavoidable secondary effect. For example, in sole attaching by cement involving the use of a high frequency field for the activation of the layer of cement previously applied to a leather sole, it is found that, during seasons of high humidity or when, for any reason, the moisture content of a sole is high, the leather sole as well as the cement layer becomes heated in the field thus releasing large amounts of moisture. The moisture thus released from the leather, if not properly disposed of, will accumulate in the aforesaid manner and cause electrical difficulties such as arcs, burning the leather or overloading the oscillator.

In one former proposal for solving the moisture problem the high frequency field electrodes have been faced or covered with a porous dielectric absorbent layer or pad placed in close contact with the object during the application of the field. There, however, the quantity of moisture absorbed was limited by the cubic volume of the absorbent layer which became saturated with extended use. In another proposal the electrodes were of complex and sometimes awkward design either to prevent the condensation of moisture altogether, as by means of a fluid heating system for the electrodes, or to accumulate the moisture in a controlled manner and allow it to drain off away from the field region.

An object of the invention is to provide novel apparatus for sole cement activation by means of a high frequency electric field derived from suitable electrodes, wherein large amounts of moisture may be disposed of and prevented from interfering with the operation.

A feature of the invention resides in the provision of a layer or pad of dielectric, usually porous, absorbent material placed between at least one electrode and an object to be treated in the field region of the electrodes. In addition, another important feature of the invention resides in means providing a passageway between the object and the layer as a vent, permitting the escape of heated vapors. The absorbent material, which is substantially at the ambient temperature at the beginning of the use of the apparatus, absorbs the moisture condensing on its surface and prevents the formation of droplets in that way. However, as the treatment progresses but before the absorbent layer becomes saturated with moisture its temperature rises to such a point that the moisture no longer tends to condense on the surface thereof but circulates out through the passageway provided. The rise in temperature of the layer results from the heating effect of the vapors and from the dielectric losses in the moist layer material.

It may, in certain applications, be desirable to collect the vapors emanating from the work. Here the vapor passageway will be confined perhaps by a hood leading to an outlet and accumulator. In these applications the voltage breakdown and efficiency problem also appears, and lends itself to solution by the present invention. Thus, in accordance with another feature of the invention, apparatus is provided which is constructed and arranged for the evaporation and collection of vapors emanating from a material without the electrical interference effects characteristic of moisture condensing in droplets on parts of the apparatus.

Advantageously, too, the apparatus has vapor escape passageways between the surface of the work and the one or more moisture absorbent layers associated with the electrodes. In one embodiment the electrodes have been inclined at an angle from the horizontal to allow the vapors to rise and pass more readily into the atmosphere.

In another embodiment and in accordance with features of the invention, the work has been supported on a pebbled or ridged surface of a lower absorbent layer positioned next to the lower electrode. This allows the vapor to escape from the under side of the work as well as from the upper side where a space is provided between the work and the layer covering the upper electrode.

In still another embodiment, the invention broadly has been applied to a grid type stray field electrode which has certain advantages over the direct field type. With stray field electrodes, meaning those in which both conductors of an electrode system are disposed at one side of a piece of work, the heating in the work is maximum at the surface next to the electrodes, and, in activating preapplied sole cement, this is desirable because the amount of moisture driven from the leather sole is thereby decreased. In the illustrative stray field electrode system disclosed herein air spaces are provided between the conductors of a flat electrode grid. The spaces not only allow the vapor to escape more readily but force the stray field to extend further toward work positioned next to and approximately parallel with the grid. Absorbent material in strips is placed over the electrode parts exposed to the vapor while leaving vapor passageways adjacent to the surface of the work as in the case of the direct field electrode described previously.

A further object of the invention is the provision of an improved method of dielectrically heating a workpiece which may emit vapors when heated by subjection to a high-frequency electric field established between cooperative electrodes, in which method condensation of such vapors upon the electrodes is substantially eliminated.

These and other features and certain novel details of construction of the invention will now be further described with reference to the accompanying drawings in which Fig. 1 is a side view of a direct field electrode system employing the invention;

Fig. 4 is a sectional side view of a modified form of the invention, employing inclined direct field electrodes;

Fig. 5 is a vertical section through a stray field type electrode embodying the invention;

Fig. 6 is a plan view on a smaller scale of the electrode of Fig. 5; and

Fig. 7 is a sectional view taken through apparatus for drying material by means of a high frequency direct field and for collecting the vapor driven from such material.

Figure 2:
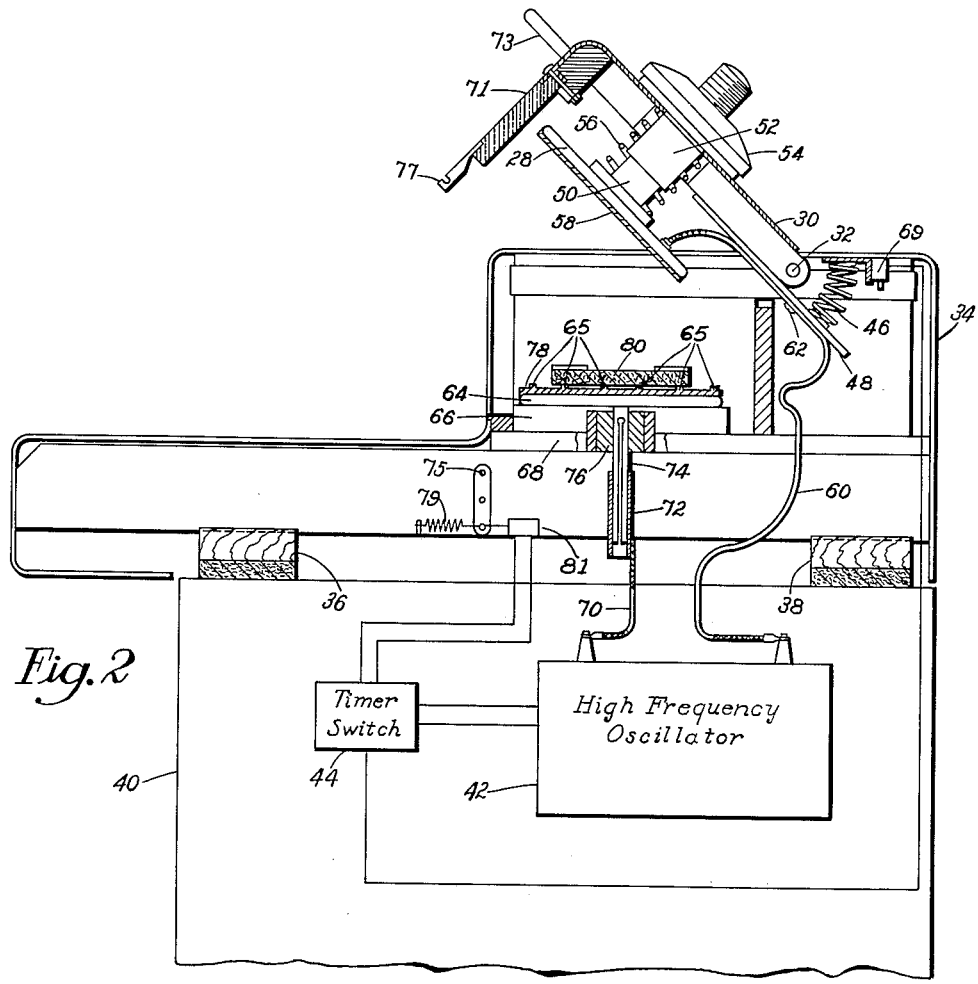
Fig. 2 is a side view, partly in section, of a machine employing direct field electrodes for sole cement activation.

In its theoretical aspects the invention has several interesting and unlooked for features. One such feature is the advantage derived from the effect of the moisture initially absorbed by the layer. As is well known, many liquids, water in particular, have a relatively high loss factor in an alternating electric field. In the present application this high loss factor is reflected in an accelerated effect on the rise in temperature of the layer. Eventually the temperature reaches a point where not only is further condensation thereon prevented but the moisture absorbed is driven from the layer and out through the passageway. The layer then acquires a relatively low over-all loss factor, that of the layer material in dry condition, which improves the efficiency of the apparatus in cases of extended use thereof. In the former proposal referred to wherein the absorbent layer was placed in direct contact with the work the moisture was retained in the layer and the efficiency of the apparatus was correspondingly lowered.

It is also important to the efficiency of the present invention that the absorbent material in the layer shall have heat insulating properties to reduce the heat conducted away or radiated by the usually adjacent metallic electrode. The absorbent material has preferably a relatively high dielectric constant as well; this, because the voltage drop incurred therein should be low relative to the voltage appearing across the object under treatment. Certain ceramic materials such as crystallized aluminum oxide formed by fusing bauxite in an electric furnace and pumice stone (Volvic rock) have been found to be suitable materials for this purpose. For convenience these materials are held together in the form of a plate or layer by any suitable bonding material.

In Fig. 1 the work to be treated comprises a shoe sole 2 having a marginal band of cement 4 previously applied and allowed to harden. The sole has been placed between opposing faces of upper and lower electrode plates 6 and 8 respectively, which are carried by the respective supporting members 10 and 12. High frequency energy is applied to the electrodes from a source 14 through leads 16 and 18. The framework for the apparatus is shown in other figures. The supporting member 10 for the upper electrode 6 is made adjustable and may be moved up and down on a carrier 11 by turning a knob 20 threaded on the member 10. Extending over the work opposing faces of the electrodes 6 and 8 are absorbent layers 22 and 24 of a suitable porous dielectric material such as the absorbent ceramic materials mentioned above, which are thus directly in the field and are subjected to the heating effects thereof. The lower layer 24, in this example, is provided with upwardly extending projections or ridges 26 which serve as spacers to hold the under side of the sole 2 away from the surface of the layer 24 for a purpose to be described.

In employing this apparatus to activate the band of cement 4, the upper electrode 6 is lowered until it is just above the upper surface of the work, leaving a narrow space between the latter and the lower face of the absorbent layer 22, as a vapor passageway or vent. With the application of high frequency energy to the electrodes the cement becomes activated but at the same time moisture in the form of vapor is driven from the surfaces of the leather sole 2. When the operator starts to work with the apparatus at a low temperature, as at the beginning of the day, this moisture condenses on the absorbent layers 22 and 24 and is absorbed thereby; but as the apparatus becomes heated with extended use, these layers no longer condense moisture and the vapor then passes out into the atmosphere through the spaces provided for that purpose. Moisture driven from the lower side of the sole 2 thus escapes through the spaces between the ridges 26 on the surface of the layer 24 and the lower side of the sole 2.

Figure 3:
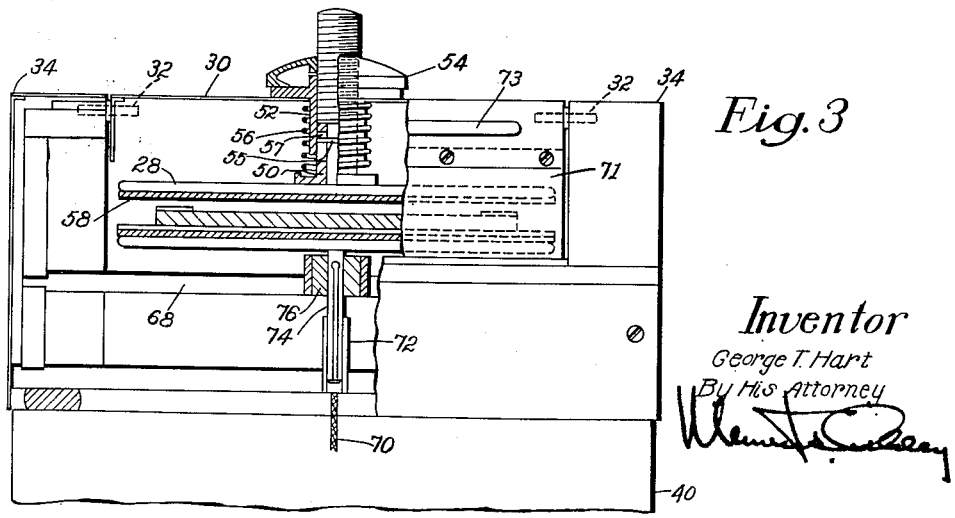
Fig. 3 is a front view, partly in section, of the same machine.

In Figs. 2 and 3 electrodes have been shown embodied in a complete apparatus designed for the activation of cement applied to unattached soles and allowed to dry thereon. An upper electrode 28 is carried by a swinging arm-like member 30 which pivots about pins 32 held in an upper framework 34 of the machine. The upper framework 34 is mounted on insulating blocks 36 and 38 which are carried by a base portion 40. Contained within the base portion 40 is electrical apparatus, including a high frequency oscillator 42 to supply power to the electrodes and a timing device 44 for determining the length of the heating interval. The swinging arm 30 is urged upwardly by means of a spring 46 which exerts pressure against a rearwardly projecting bar 48 carried by the arm-like member 30. The upper electrode 28 is supported by a post 50 which slides within a sleeve 52 on the member 30 and is provided with an adjustment knob 54. The post 50 and the knob 54 are threaded to allow moving the electrode 28 up and down by turning the knob. The adjustment mechanism additionally comprises a coiled spring 56 which urges the assembly comprising the electrode 28 and post 50 downwardly, thereby maintaining the assembly in any desired position on the member 30; and there is a key or pin 55 projecting inwardly from the sleeve 52 which slides in a keyway 57 cut in the member 50 to prevent the member 28 from rotating. A dielectric absorbent layer 58 is attached to and extends over the lower surface of the electrode 28 which is connected to one side of the high frequency oscillator 42 by means of a lead 60 (Fig. 2), connected to the upper framework at point 62.

A lower electrode 64 of the same shape and size as the electrode 28 is supported on a low-loss insulating block 66 which rests against a plate 68 forming part of the upper framework assembly 34. High frequency energy is conducted to the electrode 64 through an insulated lead 70, a sleeve 72 and an expansible slit rod 74 joined to the electrode and received in the sleeve. The rod and the sleeve permit the oscillator to be readily disconnected from the electrode 64. A low-loss insulating bushing 76 insulates the electrode 64 assembly from the supporting plate 68. An absorbent layer or pad 78 with spacer ridges 65 covers the electrode 64.

For convenience to the operator, a front window 71 is provided through which the work under treatment may be viewed. The material employed in the window 71 is preferably a lowloss plastic such as polystyrene or tenite since it is near the region of intense field and for this reason is in a position to absorb energy from the system. A handle 73 has been provided to lower the upper assembly including the arm 30. When lowered, this assembly is held in place by a latch 75 which engages a catch 77 carried on the lower end of the member 71. The latch 75 is held in place by a spring 79 and is released by the activation of a solenoid 81.

In using this machine a sole 80 to be treated is placed on the lower electrode and the swinging arm 30 is moved downward to a position directly over the work. An adjustment has previously been made by means of the knob 54 so that when the arm 30 is in this position the upper electrode is supported slightly spaced from the work thereby to provide a suitable passageway between the work and the layer 58. With the lowering of the arm 30, the high frequency oscillator 42 is turned on through the timer switch 44 which is actuated by a switch 69 closed by the lowering of the arm. At the end of the heating interval, as determined by the timer, the oscillator 42 is turned off, the solenoid 81 is energized, whereupon the catch 77 is released and the spring 46 lifts the arm member 30 for removal of the sole which is in condition for attachment to the bottom of a shoe, being applied thereto under pressure.

In Fig. 4, apparatus is shown in which the electrodes are placed in an inclined position which allows the vapor driven from the work to escape more readily by rising through the nearly vertical spaces provided for that purpose. A lower or grounded electrode 82, carried by a supporting post, 84 has a covering dielectric absorbent layer 86 with spaced vertical ridges 88 against which the work is laid. Cooperating with the electrode 82 is another electrode 90 carried by a horizontal arm 92 which is mounted on an insulating post 94. The inner face of the electrode 90 is covered with a dielectric absorbent layer 96 which is spaced a short distance from the upper surface of the work when the latter is positioned between the electrodes. Extending across the lower edges of the electrodes, a dielectric plate 98 serves as a supporting means for a timing mechanism 100 which embodies a spring loaded slidable plunger 102 and means for holding the plunger in a lower position and then releasing it and forcing it upwardly at the end of the heating interval as determined by the mechanism 100. The plate 98 may be slotted or perforated to improve the circulation of air past the work. The mechanism 100 may also embody a switch, if desired, to turn on and off a high frequency oscillator 106 supplying the electrodes.

A shoe sole 104 previously coated with thermoactive cement may then be inserted in the space between the electrodes and forced against the plunger 102 which cocks the latter, starts the timer and the oscillator. At a predetermined later time the plunger 102 is released and the heated sole is forced upwardly into position where it may be grasped and removed by the operator. Suitable mechanism 100 for this purpose is well known and for that reason is not described in detail herein.

In using the arrangement of Figs. 5 and 6, the work to be treated is placed in the field region of a stray field electrode grid which is adapted to be supported in the same manner as is the upper electrode of Figs. 1 to 3. This grid comprises elongated loop conductors 108, 110 and 112 which are embedded in the corespondingly shaped loops of rubber or other suitable low-loss insulating material 114, 116 and 118 respectively, the whole being held together by three transverse rods 120, 122 and 124 extending through the rubber members. The exposed surfaces of the rubber members are covered by layers of absorbent material 126 of a suitable thickness to absorb moisture driven from the work during the early portion of the period of use of the system as aforedescribed. Air spaces or gaps are left between the sections of the grid to increase the fringing or bulging effect of the field, forcing it down into the work and to provide passages through which the vapor may more readily escape. The space between these members is preserved by means of the spacer rings 128, of dielectric absorbent material also, which are carried by the rods 120, 122 and 124.

The work to be treated, which may be a shoe sole 134, is placed on a table 130 directly beneath the electrode grid and high frequency energy is applied to the conductors 108, 110 and 112 from a source 132, alternate conductors being connected to opposite sides of the source, as shown. At this point, it is important to recognize one advantage of this type of electrode which is the fact that the upper surface of the work is heated to the highest temperature, the lower portion being heated to a much lesser extent because of the nature of the field which is greater in intensity nearer the electrodes. For this reason it may even be unnecessary to cover the surface of the table 130 with absorbent material since very little moisture will be driven from the lower side of the work 134.

In some applications it is desirable to collect the vapor driven from the work under treatment; and, where a high frequency field is employed, in drying the work material, the same problems of moisture condensation and consequent voltage breakdown will occur. In Fig. 7 the invention has been shown as applied to apparatus of this type wherein a block of material 136 is placed between electrodes 138 and 140. Covering the lower electrode 140 and separating it from the material under treatment, a dielectric absorbent layer 142 is provided, having ridges 144 which prevent surface-to-surface contact of the block of material and the layer. The upper electrode 138 is covered with a dielectric absorbent layer 146 which has a central aperture 148 through which the vapor may pass into the piping system 150 and from there to a suitable disposal point not shown. The inner surface 152 of a lead-off pipe 154 is set back from the edge of the aperture 148 to prevent moisture droplets from condensing and flowing back into the region of the electrodes. The under surface of the absorbent layer 146 is shown in the shape of a hood to facilitate the flow of vapor to the aperture 148. If desired, the work may be enclosed by walls (not shown) of absorbent material extending around the edges of the electrodes and adjoining the outer edges of the absorbent layers 142 and 146. The lead-off pipe 154 is of insulation material to permit the upper electrode 138 to be connected to the high voltage side of an oscillator 156 through the lead 158. The lower electrode 140 is shown grounded.

In use, this apparatus functions similarly to the other electrode systems described herein with respect to the prevention of voltage arc-over.

Having thus described my invention, what I claim as new and desire to secure by Letters Patent of the United States is:

1. In apparatus of the class described, coacting electrodes adapted, when supplied with high frequency electric energy, to establish an alternating electric field in a work piece supported in predetermined operative relation to the electrodes, absorbent material disposed for shielding at least a portion of the work-opposing surface of an electrode from vapor emanating from said work piece, and means for maintaining during operation a substantially spaced relation between the work piece and the absorbent material to provide for the escape of vapors emanating therefrom during the application of a high-frequency field, the material being adapted to absorb at least a part of the moisture which may condense thereon when starting to use the apparatus, and for retaining heat at the surface thereof to prevent the condensation of moisture thereon with continued use of the apparatus.

2. Apparatus in accordance with claim 1 in which the work-opposing surfaces of said electrodes are covered with a layer of absorbent material and are inclined from the horizontal to provide a vent for the escape of vapors emitted from said object.

3. Apparatus in accordance with claim 1 in which the work-opposing surface of said material forms a hood containing an aperture for collecting vapors emanating from the work, and means at said aperture for conducting said vapors to a disposal point.

4. Apparatus of the class described comprising upper and lower electrode members, moisture absorbent dielectric layers secured to adjacent sides of said members, means for supporting an object to be treated in the field region of said electrodes with a space between the object and the major part of the exposed surface of the absorbent material on the lower electrode to provide a vapor escape passageway, and means for moving said upper electrode member and its absorbent layer into a predetermined position spaced from said object to provide a vapor passageway adjoining the upper surface of said object.

5. Apparatus in accordance with claim 4 in which said electrode members are inclined from the horizontal to provide a vent through which vapors emitted from said object may escape to the atmosphere.

6. Apparatus in accordance with claim 4 in which said supporting means comprises projections from said absorbent dielectric layer on said lower electrode member.

7. Apparatus of the class described comprising electrodes having mutually opposite work faces, one electrode being mounted for movement toward and away from the other to facilitate the insertion of a piece of work therebetween, a layer of absorbent dielectric material on the work face of at least one electrode, and a spacer to prevent close contact of a piece of work with at least part of said layer.

8. Apparatus of the class described comprising upper and lower plate electrodes one of which is mounted for movement toward and away from the other to facilitate the insertion of a piece of work between the inner faces of the electrodes, a layer of absorbent dielectric material on the inner face of the upper electrode, and an adjustable device for variably limiting the toward movement of the movable electrode to leave a space between said dielectric material and the work.

9. In sole cement activating apparatus of the class described, a work-supporting member, stray-field-electrode means adapted to be supported above said member and comprising substantially parallel conductors and a moisture absorbent dielectric layer between said conductors and said member, and means for supporting said electrode means above the work and substantially spaced therefrom to provide a vapor passageway therebetween during operation.

10. In sole cement activating apparatus of the class described, a work-supporting member, stray-field-electrode means adapted to be supported adjacent thereto and comprising a grid of spaced elongated conductors lying side by side one another, strips of moisture absorbent dielectric material at least partly covering the faces of said conductors adjacent to the work-supporting member, and means for supporting said electrode means adjacent to said member and substantially spaced from a work piece on said member during operation.

11. In high frequency electric heating apparatus, a stray-field electrode system comprising a plurality of electrode conductors arranged in the form of an open grid adapted to be positioned at one side of a piece of work, adjacent conductors being adapted to be connected to opposite terminals of a source of high frequency energy, and absorbent covering material in strips at least partly covering said conductors on the work-face side, the covering strips on adjacent conductors having open spaces between one another to permit air circulation through these spaces and better to confine the path of the field to the work.

12. Apparatus as in claim 11 in which said conductors form elongated closed loops lying in substantially the same plane and in which the covering material comprises a low-loss dielectric.

13. The method of dielectrically heating a work piece which may emit vapors when heated by subjection to a high-frequency electric field established between cooperative electrodes which comprises the steps of shielding an electrode portion exposed to such vapor with absorbent material and subjecting the work piece to the alternating field from the electrodes while maintaining said material and the work piece in substantially spaced relation.

GEORGE T. HART.

REFERENCES CITED

The following references are of record in the file of this patent:

UNITED STATES PATENTS

| Number | Name | Date |
| --- | --- | --- |
| 1,806,846 | Fox et al. | May 26, 1931 |
| 1,903,222 | Mason | Mar. 28, 1933 |
| 2,042,145 | Darrah | May 26, 1936 |
| 2,112,418 | Hart et al. | Mar. 29, 1938 |
| 2,179,261 | Keller | Nov. 7, 1939 |
| 2,263,681 | Hart | Nov. 25, 1941 |
| 2,304,958 | Rouy | Dec. 15, 1942 |
| 2,321,756 | Kyle | June 15, 1943 |
| 2,325,652 | Bierwirth | Aug. 3, 1943 |
| 2,390,572 | Brabander | Dec. 11, 1945 |
| 2,412,982 | Hart | Dec. 24, 1946 |
| 2,428,615 | Brown | Oct. 7, 1947 |

OTHER REFERENCES

Curtis, "High Frequency Induction Heating," first edition, fourth impression, 1944. McGraw-Hill Book Co., Inc., New York city, page 230.